United States Patent
Wu

(10) Patent No.: US 11,184,802 B2
(45) Date of Patent: Nov. 23, 2021

(54) DATA PROCESSING METHOD, MOBILE TERMINAL, AND COMPUTER READABLE STORAGE MEDIUM

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 64 days.

(21) Appl. No.: 16/617,251

(22) PCT Filed: Jun. 5, 2018

(86) PCT No.: PCT/CN2018/089982
§ 371 (c)(1),
(2) Date: Nov. 26, 2019

(87) PCT Pub. No.: WO2018/228242
PCT Pub. Date: Dec. 20, 2018

(65) Prior Publication Data
US 2021/0136626 A1     May 6, 2021

(30) Foreign Application Priority Data

Jun. 15, 2017   (CN) .......................... 201710453560.6

(51) Int. Cl.
*H04W 28/08*      (2009.01)
*H04W 28/02*      (2009.01)
(52) U.S. Cl.
CPC ..... *H04W 28/085* (2013.01); *H04W 28/0278* (2013.01)
(58) Field of Classification Search
None
See application file for complete search history.

(56) References Cited

U.S. PATENT DOCUMENTS

| 2011/0170545 | A1 | 7/2011 | Zheng et al. |
| 2015/0245349 | A1 | 8/2015 | Jha et al. |
| 2016/0065700 | A1 | 3/2016 | Yi et al. |

(Continued)

FOREIGN PATENT DOCUMENTS

| CN | 101686180 A | 3/2010 |
| CN | 104753627 A | 7/2015 |

(Continued)

OTHER PUBLICATIONS

Chinese Office Action Application No. 201710453560.6; dated Jan. 14, 2020.
Chinese Search Report Application No. 201710453560.6; dated Apr. 16, 2019.
European Search Report Application No. 18818100; dated Apr. 17, 2020.

(Continued)

*Primary Examiner* — Charles C Jiang
*Assistant Examiner* — Saad Khawar
(74) *Attorney, Agent, or Firm* — von Briesen & Roper, s.c.

(57) ABSTRACT

The present disclosure provides a data processing method, a mobile terminal, and a computer-readable storage medium. The method of the present disclosure comprises: receiving indication information, the indication information being used for indicating whether to duplicate cached data in a PDCP layer; and if the indication information indicates duplicating the cached data in the PDCP layer, performing predetermined processing on the cached data in the PDCP layer.

19 Claims, 6 Drawing Sheets

(56) References Cited

U.S. PATENT DOCUMENTS

| | | | |
|---|---|---|---|
| 2017/0041100 A1 | 2/2017 | Xie et al. | |
| 2017/0055176 A1 | 2/2017 | Xiao et al. | |
| 2017/0085492 A1 | 3/2017 | Xiao et al. | |
| 2019/0098606 A1* | 3/2019 | Sharma | H04B 7/0404 |
| 2019/0223251 A1 | 7/2019 | Jiang et al. | |
| 2020/0037151 A1* | 1/2020 | Du | H04L 1/22 |
| 2020/0382988 A1* | 12/2020 | Zhao | H04W 28/0278 |

FOREIGN PATENT DOCUMENTS

| | | |
|---|---|---|
| CN | 104935413 A | 9/2015 |
| CN | 105376801 A | 3/2016 |
| CN | 105517058 A | 4/2016 |
| CN | 106105304 A | 11/2016 |
| CN | 106538037 A | 3/2017 |

OTHER PUBLICATIONS

International Search Report & Written Opinion related to Application No. PCT/CN2018/089982; dated Jun. 5, 2018.
Ericsson, "Further aspects of data duplication in PDCP layer", 3GPP TSG-RAN WG2 #97, Tdoc R2-1700834.
Nokia, Alcatel-Lucent Shanghai Bell, "Overview of Duplication Operation", 3GPP TSG-RAN WG2 Meeting #97bis, R2-1702632.
Catt, "PDCP Duplication", 3GPP TSG-RAN WG2 Meeting #97bis, R2-1703114.
Ericsson, "PDCP data volume reporting in duplication (BSR)", 3GPP TSG-RAN WG2 #98, Tdoc R2-1704370.
ZTE, "Consideration on the BSR for data duplication", 3GPP TSG-RAN WG2 Meeting #98, R2-1704665.
QUALCOMM Incorporated, "Discussion on PDCP duplication", 3GPP TSG-RAN WG2 Meeting #98, R2-1705056.

\* cited by examiner

DATA PROCESSING METHOD, MOBILE TERMINAL, AND COMPUTER READABLE STORAGE MEDIUM

CROSS-REFERENCE TO RELATED APPLICATION

This patent application is a 35 USC § 371 U.S. national stage of International Application No. PCT/CN2018/089982 filed on Jun. 5, 2018, which claims a priority to Chinese Patent Application No. 201710453560.6 filed on Jun. 15, 2017, which are incorporated herein by reference in their entirely.

TECHNICAL FIELD

The present disclosure relates to the field of communication application, in particular to a data processing method, a mobile terminal and a computer readable storage medium.

BACKGROUND

Currently, bearer types of data transmission of the Packet Data Convergence Protocol (PDCP) layer include two types of split bearers, split bearer type 1 and split bearer type 2.

In the split bearer type 1, one PDCP (i.e., one data radio bearer DRB) corresponds to a plurality of Radio Link Control (RLC) entities, and a plurality of RLC entities correspond to one Media Access Control (MAC) entity.

In the split bearer type 2, one PDCP (i.e., one DRB) corresponds to a plurality of RLC entities, and each RLC entity corresponds to one MAC entity. Different MAC entities may correspond to different cell groups, such as a Master Cell Group (MCG) and a Secondary Cell Group (SCG).

After PDCP duplication function is enabled, if PDCP data transmission is performed by using a data transmission scheme in the related art, repeated data packets are caused to be sent through one transmission path, which is inconsistent with the implementation that a plurality of duplication data in the PDCP duplication function must be sent over a plurality of transmission paths, so that the transmission of PDCP duplication data may not be realized.

In addition, when reporting of buffer status report BSR is performed, when a mobile terminal initiates PDCP duplication, if the PDCP data is buffered in the PDCP layer, since different logical channels correspond to the same PDCP entity, this may result in that repeated data packets are counted in different logical channels, which leads to doubling reporting data amount and a waste of transmission resources. Therefore, after the PDCP duplication function is enabled, a new solution is required to provide to solve the problem of data processing in the PDCP layer.

SUMMARY

The present disclosure provides a data processing method applied to a mobile terminal, including:

Receiving indication information for indicating whether the mobile terminal duplicates buffer data in a Packet Data Convergence Protocol PDCP layer; and Performing predetermined processing on the buffer data in the PDCP layer if the indication information indicates duplicating the buffer data in the PDCP layer.

The embodiment of the present disclosure also provides a mobile terminal, including:

A receiving module, configured to receive indication information for indicating whether the mobile terminal duplicates buffer data in a Packet Data Convergence Protocol PDCP layer; and A processing module, configured to perform predetermined processing on the buffer data in the PDCP layer if the indication information indicates duplicating the buffer data in the PDCP layer.

The embodiment of the present disclosure also provides a mobile terminal, including a processor and a memory, wherein a computer program executable on the processor is stored in the memory, when the computer program is executed by the processor, the processor implements steps of the data processing method.

The embodiment of the present disclosure also provides a computer readable storage medium that stores a computer program thereon, wherein when the computer program is executed by a processor, the processor implements steps of the data processing method.

DETAILED DESCRIPTION

The technical solutions in the embodiments of the present disclosure will be clearly and completely described in combination with the accompanying drawings in the embodiments of the present disclosure. It is obvious that the described embodiments are a part of the embodiments of the present disclosure, but not all embodiments. All other embodiments obtained by a person of ordinary skill in the art based on the embodiments of the present disclosure without departing from the inventive scope are the scope of the disclosure.

Figure 1:
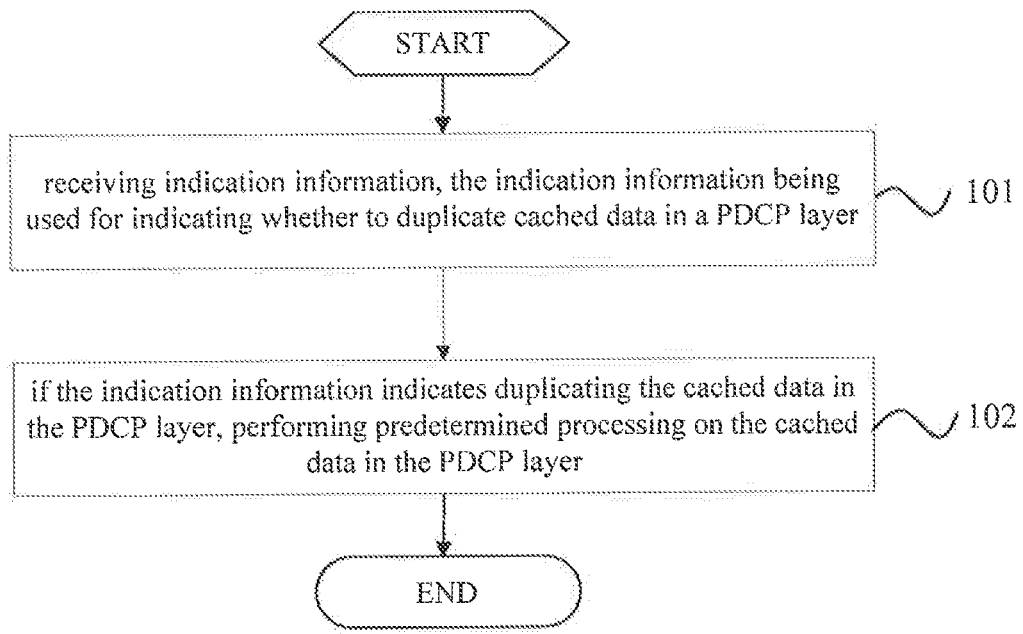
FIG. 1 is a first working flow chart illustrating a data processing method according to some embodiments of the present disclosure.

As shown in FIG. 1, embodiments of the present disclosure provide a data processing method applied to a mobile terminal, the method includes step 101 and step 102.

In step 101, indication information for indicating whether the mobile terminal duplicates buffer data in a Packet Data Convergence Protocol PDCP layer is received.

Specifically, the indication information is sent by medium access control layer control signaling (MAC CE), that is, the PDCP duplication function is enabled (activated) or stopped (deactivated) by the medium access control layer control signaling.

In step 102, predetermined processing is performed on the buffer data in the PDCP layer if the indication information indicates duplicating the buffer data in the PDCP layer.

Figure 2:
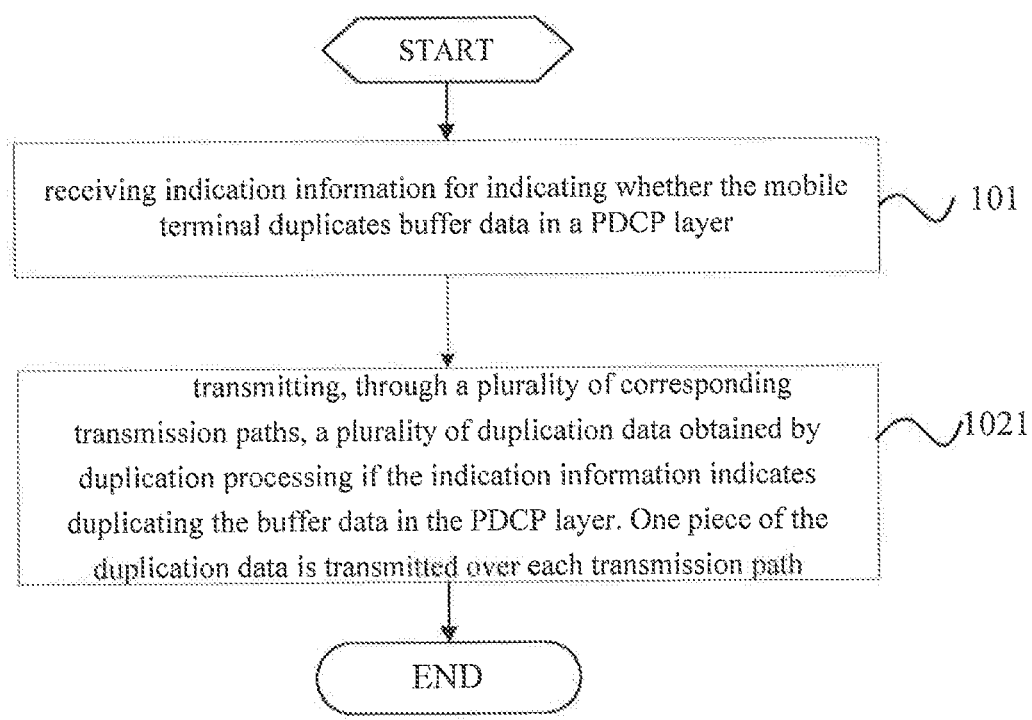
FIG. 2 is a second working flow chart illustrating a data processing method according to some embodiments of the present disclosure.

Specifically, as shown in FIG. 2, the step 102 includes step 1021.

In step 1021, a plurality of duplication data obtained by duplication processing is transmitted through a plurality of corresponding transmission paths if the indication information indicates duplicating the buffer data in the PDCP layer; wherein, one piece of the duplication data is transmitted over each transmission path of the plurality of corresponding transmission paths.

Specifically, when transmission indication information transmitted over the transmission path is received, one piece of the duplication data is sent over the transmission path over which the transmission indication information is sent.

Further, prior to the step of transmitting, through a plurality of corresponding transmission paths, plural pieces of duplication data obtained by duplication processing, the method further includes:

One or more copies of the duplication data are stored in the PDCP layer.

The specific implementation manner of the above step 1021 is exemplified as follows.

The First Implementation

At most one piece of the duplication data is stored in the PDCP layer. A PDCP entity sends all the duplication data to an RLC entity, and the RLC entity may be configured by the network side (such as the SCG RLC entity of the PDCP duplication bearer). Assuming that PDCP PDU1 is duplicated two (2) times (such as PDU1 (COPY1) and PDU1 (COPY2)), only one piece of the duplication data is reserved in the PDCP layer (such as PDU1 (COPY1)), while the duplication data (such as PDU1 (COPY2)) is sent directly to the RLC entity (such as a SCG RLC entity) without being stored, and the PDU1 (COPY1) is sent to a MCG RLC.

The Second Implementation

All duplication data can be stored in the PDCP layer. Plural pieces of the duplication data are required to be sent to the RLC entities over the different paths. Assuming that PDCP PDU1 is duplicated two (2) times (such as PDU1 (COPY1) and PDU1 (COPY2)), then the PDCP entity can reserve two (2) pieces of the duplication data, and the PDCP entity sends the PDU1 (COPY1) to a MCG RLC entity and sends the PDU1 (COPY2) to a SCG RLC entity.

The Third Implementation

All duplication data can be stored in the PDCP layer. Plural pieces of the duplication data are required to be sent over the different paths, but the PDCP layer can only send the duplication data to the underlying entity only when receiving transmission indication information from the underlying layer. Assuming that the PDCP PDU1 is duplicated two (2) times (such as PDU1 (COPY1) and PDU1 (COPY2)), then the PDCP entity may reserve two (2) pieces of the duplication data, and after receiving the transmission indication information over the MCG path, the PDCP entity sends the PDU1 (COPY1) to the MCG RLC entity, and after receiving the transmission indication information over the SCG path, the PDCP entity sends the PDU1 (COPY2)) to the SCG RLC entity.

The method in the embodiment of the present disclosure, when the indication information indicates duplicating the cache data in the PDCP layer, a plurality of duplication data obtained by duplication processing are transmitted over a plurality of corresponding transmission paths, wherein one piece of the duplication data is transmitted over one transmission path, which prevents the problem that duplication data is transmitted through one transmission path under the PDCP duplication function.

Figure 3:
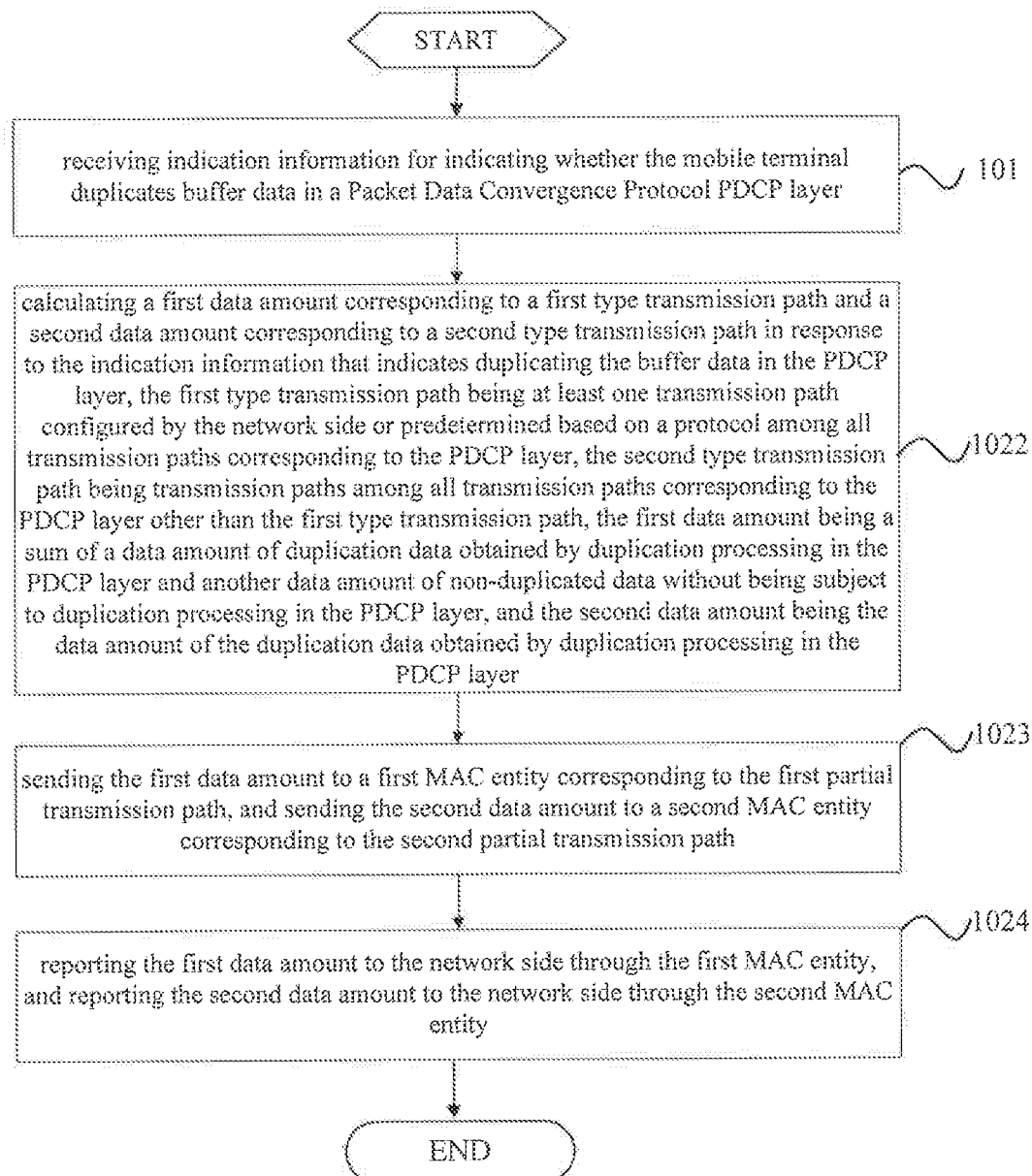
FIG. 3 is a third working flow chart illustrating a data processing method according to some embodiments of the present disclosure.

Further, as shown in FIG. 3, the above step 102 further includes steps 1022-1024.

In step 1022, if the indication information indicates duplicating the buffer data in the PDCP layer, a first data amount corresponding to a first partial transmission path and a second data amount corresponding to a second partial transmission path are calculated, the first partial transmission path is at least one transmission path configured by a network side or predetermined based on a protocol, the second partial transmission path is transmission paths among all transmission paths corresponding to the PDCP layer other than the first partial transmission path, the first data amount is a sum of a data amount of the duplication data obtained by duplication processing in the PDCP layer and a data amount of data without being duplicated in the PDCP layer, and the second data amount is the data amount of the duplication data.

In step 1023, the first data amount is sent to a first MAC entity corresponding to the first partial transmission path, and the second data amount is sent to a second MAC entity corresponding to the second partial transmission path.

In step 1024, the first data amount is reported to the network side through the first MAC entity, and the second data amount is reported to the network side through the second MAC entity.

Specifically, when reporting of the buffer status report data BSR is performed, distinction and statistics on the duplicated data and the data without being duplicated are performed, so that a first data amount corresponding to the first partial transmission path includes the data amount of the duplicated data and the data without being duplicated, and a second data amount corresponding to the second partial transmission path only includes the data amount of the duplicated data, thereby reducing report data amount, then reducing waste of resources.

Further, in an embodiment of the present disclosure, plural copies of duplication data are obtained by the duplication processing in the PDCP layer, the data amount of the duplication data is a data amount of one or more copies of the duplication data.

The following describes an implementation manner of how to perform statistics on the data without being duplicated and the duplicated data in the PDCP in the embodiment of the present disclosure.

(1) Statistics on the Data without being Duplicated

A data amount corresponding to one, more or all transmission paths (such as a plurality of logical channels or logic channel groups of the PDCP duplication bearer) corresponding to the PDCP layer configured by a network side or predetermined based on a protocol includes the data amount of the data without being duplicated.

(2) Statistics on the Duplicated Data

A data amount corresponding to all transmission paths (such as a plurality of logical channels or logic channel groups of the PDCP duplication bearer) corresponding to the PDCP layer configured by a network side or predetermined based on a protocol includes the data amount of one or more pieces of the duplicated data.

Assuming that PDU1 (COPY1) and PDU1 (COPY2)) is generated after the PDCP PDU1 duplication, the MCG or SCG logical channel of the PDCP duplication bearer only performs statistics on the data amount of one PDU1, or the MCG or SCG logical channel of the PDCP duplication bearer performs statistics on the data amount of two PDU1s.

Figure 8:
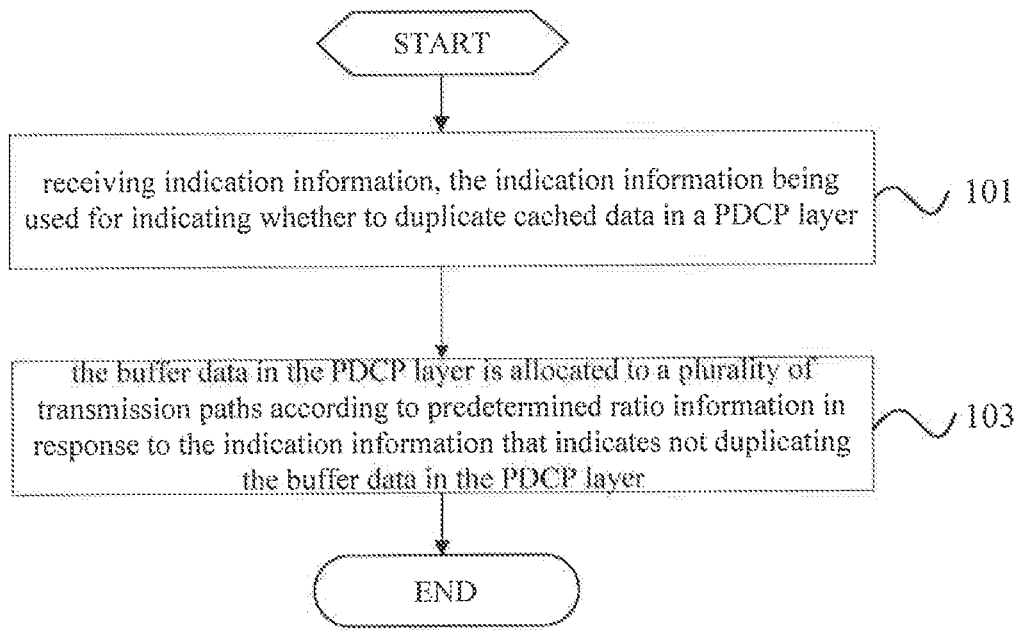
FIG. 8 is a fourth working flow chart illustrating a data processing method according to some embodiments of the present disclosure.

Further, as shown in FIG. 8, after the above step 101, the method further includes step 103.

In step 103, the buffer data in the PDCP layer is allocated to a plurality of transmission paths according to predetermined ratio information if the indication information indicates not duplicating the buffer data in the PDCP layer.

Specifically, the buffer data in the PDCP layer is divided into plural pieces of buffer data according to the predetermined ratio information, and each of the divided buffer data is sent over one transmission path.

Further, prior to the step 103, the method further includes:
According to the predetermined ratio information and a data amount corresponding to the buffer data in the PDCP layer, a data amount required to be transmitted over each transmission path is calculated and is reported to a network side.

Here, when a UE reports BSR, a data amount to be sent over the path is calculated based on the buffer data of the logical channel of the different path according to the predetermined ratio information (for example, the logical channel data amount of the MCG in the BSR is 30% of the data, and the logical channel data amount of the SCG is 70% of the data).

The embodiment of the present disclosure achieves more accurate BSR report by controlling a way of the BSR performing statistics on BS (Buffer Status) of the PDCP.

Figure 9:
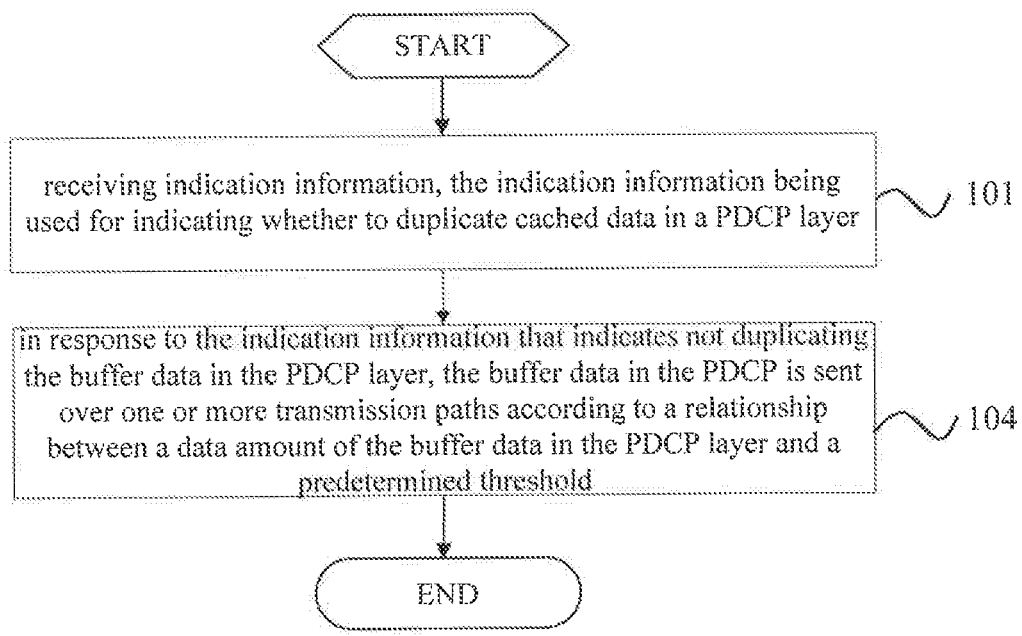
FIG. 9 is a fifth working flow chart illustrating a data processing method according to some embodiments of the present disclosure.

Further, after the step 101, as shown in FIG. 9, the method further includes step 104.

In step 104, if the indication information indicates not duplicating the buffer data in the PDCP layer, the buffer data in the PDCP is sent over one or more transmission paths according to a relationship between a data amount of the buffer data in the PDCP layer and a predetermined threshold.

Specifically, the buffer data in the PDCP is sent over one or more transmission paths when transmission indication information sent by an underlying protocol layer is received.

Here, the data amount of the buffer data in the PDCP layer is less than the predetermined threshold, then the buffer data in the PDCP layer is sent over one transmission path, otherwise, the buffer data in the PDCP layer is sent over the plurality of transmission paths.

Further, prior to the step 104, the method further includes: calculating a data amount required to be transmitted over each transmission path and reporting it to a network side.

Specifically, if the data amount of the PDCP is less than the predetermined threshold, the PDCP sends data over a path specified by the network, when the UE reports the BSR, the data amount of the buffer data to be sent to the logical channel is calculated (for example, the network configuration is sent to the MCG, statistics on the data in the bearer PDCP is performed only by the logical channel of the MCG). If the data amount of the PDCP is greater than or equal to the predetermined threshold, the PDCP sends data over a plurality of paths, when the UE reports the BSR, the data amount of the buffer data to be sent to each logical channel is calculated (such as statistics on the data in the bearer PDCP is performed by the logical channels of the MCG and the SCG).

Figure 10:
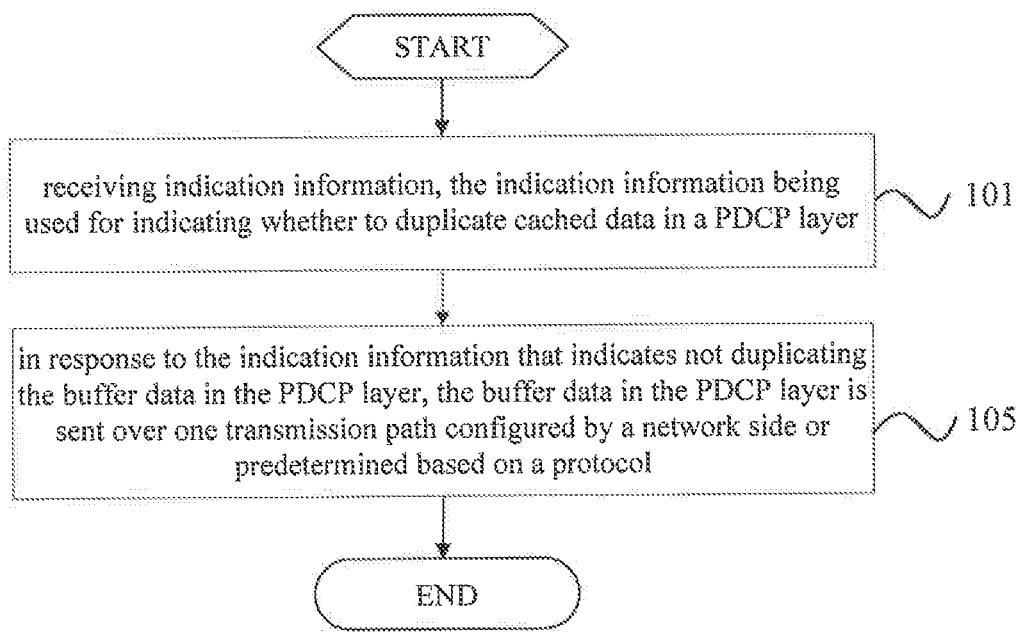
FIG. 10 is a sixth working flow chart illustrating a data processing method according to some embodiments of the present disclosure.

Further, after the step 101, as shown in FIG. 10, the method further includes step 105.

In step 105, if the indication information indicates not duplicating the buffer data in the PDCP layer, the buffer data in the PDCP layer is sent over one transmission path configured by a network side or predetermined based on a protocol.

Further, prior to the step 105, the method further includes:
A data amount required to be transmitted over the transmission path configured by the network side or predetermined based on the protocol is calculated, and is reported to the network side.

Here, the PDCP sends data over a path specified by the network, when the UE reports the BSR, the data amount of the buffer data to be sent to the logical channel is calculated (if the network configuration is sent to the MCG, statistics on the data in the bearer PDCP is performed only by the logical channel of the MCG).

For the case of activating the PDCP duplication function and deactivating the PDCP duplication function, the embodiments of the present disclosure implement switching between the PDCP duplication function and PDCP non-duplication function by specifying two sets of different UE processing actions.

The method of the present disclosure is used to support the UE, in the case of PDCP duplication activation and deactivation, according to different BSR reporting processes and PDCP data processing procedures, to implement that duplication data is transmitted according to different paths to avoid repeatedly reporting of data.

Figure 4:
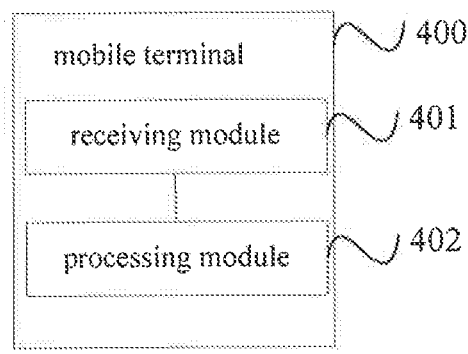
FIG. 4 is a first structural block diagram of a mobile terminal according to some embodiments of the present disclosure.

As shown in FIG. 4, the embodiment of the present disclosure provides a mobile terminal 400, including a receiving module 401 and a processing module 402.

The receiving module 401 is configured to receive indication information for indicating whether the mobile terminal duplicates buffer data in a Packet Data Convergence Protocol PDCP layer.

The processing module 402 is configured to perform predetermined processing on the buffer data in the PDCP layer if the indication information indicates duplicating the buffer data in the PDCP layer.

In the mobile terminal of the embodiment of the present disclosure, the processing module 402 includes a first processing submodule.

The first processing submodule is configured to transmit, through a plurality of corresponding transmission paths, plural pieces of duplication data obtained by duplication processing if the indication information indicates duplicating the buffer data in the PDCP layer, wherein one piece of the duplication data is transmitted over each transmission path of the plurality of corresponding transmission paths.

In the mobile terminal of the embodiment of the present disclosure, the first processing submodule is configured to, when transmission indication information transmitted over the transmission path is received, send one piece of the duplication data over the transmission path over which the transmission indication information is sent.

The mobile terminal of the embodiment of the present disclosure further provides a storage module.

The storage module is configured to store one or more copies of the duplication data in the PDCP layer.

In the mobile terminal of the embodiment of the present disclosure, the processing module 402 includes a statistics submodule, a sending submodule and a report submodule.

The statistics submodule is configured to calculate a first data amount corresponding to a first partial transmission path and a second data amount corresponding to a second partial transmission path if the indication information indicates duplicating the buffer data in the PDCP layer, the first partial transmission path is at least one transmission path configured by a network side or predetermined based on a protocol, the second partial transmission path is transmission paths among all transmission paths corresponding to the PDCP layer other than the first partial transmission path, the first data amount is a sum of a data amount of the duplication data obtained by duplication processing in the PDCP layer and a data amount of data without being duplicated in the PDCP layer, and the second data amount is the data amount of the duplication data.

The sending submodule is configured to send the first data amount to a first MAC entity corresponding to the first partial transmission path, and send the second data amount to a second MAC entity corresponding to the second partial transmission path.

The report submodule is configured to report the first data amount to the network side through the first MAC entity, and report the second data amount to the network side through the second MAC entity.

In the mobile terminal of the embodiment of the present disclosure, plural copies of duplication data are obtained by the duplication processing in the PDCP layer, the data amount of the duplication data is a data amount of one or more copies of the duplication data.

The mobile terminal of the embodiment of the present disclosure further provides a first transmission module.

The first transmission module is configured to allocate the buffer data in the PDCP layer to a plurality of transmission paths according to predetermined ratio information if the indication information indicates not duplicating the buffer data in the PDCP layer.

The mobile terminal of the embodiment of the present disclosure further provides a first report module.

The first report module is configured to, according to the predetermined ratio information and a data amount corresponding to the buffer data in the PDCP layer, calculate a data amount required to be transmitted over each transmission path and reporting it to a network side.

The mobile terminal of the embodiment of the present disclosure further provides a second transmission module.

The second transmission module is configured to, if the indication information indicates not duplicating the buffer data in the PDCP layer, send the buffer data in the PDCP over one or more transmission paths according to a relationship between a data amount of the buffer data in the PDCP layer and a predetermined threshold.

In the mobile terminal of the embodiment of the present disclosure, the second transmission module is configured to send the buffer data in the PDCP over one or more transmission paths when transmission indication information sent by an underlying protocol layer is received.

In the mobile terminal of the embodiment of the present disclosure, the second transmission module is configured to, if the data amount of the buffer data in the PDCP layer is less than the predetermined threshold, send the buffer data in the PDCP layer over one transmission path; otherwise, send the buffer data in the PDCP layer over a plurality of the transmission paths.

The mobile terminal of the embodiment of the present disclosure further provides a second report module.

The second report module is configured to calculate a data amount required to be transmitted over each transmission path and reporting to a network side.

The mobile terminal of the embodiment of the present disclosure further provides a third transmission module.

The third transmission module is configured to, if the indication information indicates not duplicating the buffer data in the PDCP layer, send the buffer data in the PDCP layer over one transmission path configured by a network side or predetermined based on a protocol.

The mobile terminal of the embodiment of the present disclosure further provides a third report module.

The third report module is configured to calculate a data amount required to be transmitted over the transmission path configured by the network side or predetermined based on the protocol, and report it to the network side.

The mobile terminal of the embodiment of the present disclosure receives indication information for indicating whether the mobile terminal duplicates buffer data in a Packet Data Convergence Protocol PDCP layer; and performs predetermined processing on the buffer data in the PDCP layer if the indication information indicates duplicating the buffer data in the PDCP layer, so that plural pieces of the duplication data in the PDCP are transmitted over a plurality of corresponding transmission paths, distinction and statistics on the duplicated data between the data without being duplicated are performed, so that a first data amount corresponding to the first partial transmission path includes the data amount of the duplicated data and the data without being duplicated, and a second data amount corresponding to the second partial transmission path only includes the data amount of the duplicated data, thereby reducing report data amount, then reducing waste of resources.

It should be noted that, the mobile terminal corresponds to the terminal in the above method embodiment, and all implementation manners in the above method embodiment are applicable to the embodiment of the mobile terminal, and the same technical effect can be achieved.

Figure 5:
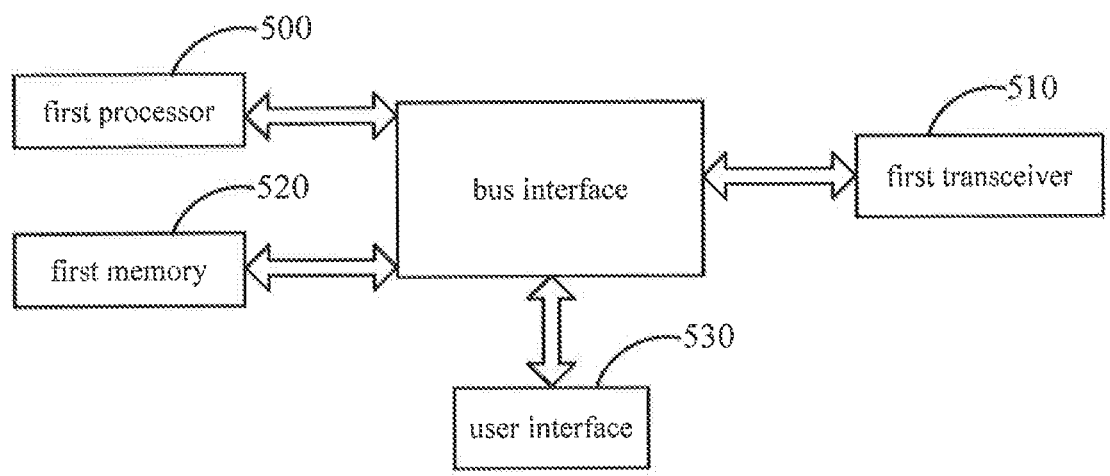
FIG. 5 is a second structural block diagram of a mobile terminal according to some embodiments of the present disclosure.

In order to achieve the above purpose, as shown in FIG. 5, an embodiment of the present disclosure further provides a mobile terminal including a memory 520, a processor 500, a transceiver 510, a user interface 530, a bus interface, and a computer program stored on the memory 520 and operable on the processor 500, wherein the processor 500 is used for reading the program in the memory 520 to perform the following process.

Indication information for indicating whether the mobile terminal duplicates buffer data in a Packet Data Convergence Protocol PDCP layer is received.

Predetermined processing is performed on the buffer data in the PDCP layer if the indication information indicates duplicating the buffer data in the PDCP layer.

In FIG. 5, the bus architecture may include any number of interconnected buses and bridges, specifically one or more processors represented by processor 500 and various circuits of the memory represented by memory 520 are link together. The bus architecture can also link various other circuits such as peripherals, voltage regulators, and power management circuits, etc., which are well known in the art and, therefore, will not be further described herein. The bus interface provides an interface. The transceiver 510 can be a plurality of components, including a transmitter and a receiver, and can provide units for communicating with various other devices on a transmission medium. For different user equipment, the user interface 530 may also be an interface capable of externally/internally connecting the required devices, including but not limited to a keypad, a display, a speaker, a microphone, a joystick, and the like.

The processor 500 is responsible for managing the bus architecture and general processing, and the memory 520 can store data used by the processor 500 when performing operations.

The processor 500 is further configured to: transmit, through a plurality of corresponding transmission paths, plural pieces of duplication data obtained by duplication processing if the indication information indicates duplicating the buffer data in the PDCP layer, wherein one piece of the duplication data is transmitted over one transmission path.

The processor 500 is further configured to: when transmission indication information transmitted over the transmission path is received, send one piece of the duplication data over the transmission path over which the transmission indication information is sent.

The processor 500 is further configured to: store one or more copies of the duplication data in the PDCP layer.

The processor 500 is further configured to: calculate a first data amount corresponding to a first partial transmission path and a second data amount corresponding to a second partial transmission path if the indication information indicates duplicating the buffer data in the PDCP layer, the first partial transmission path is at least one transmission path configured by a network side or predetermined based on a protocol, the second partial transmission path is transmission paths among all transmission paths corresponding to the PDCP layer other than the first partial transmission path, the first data amount is a sum of a data amount of the duplication data obtained by duplication processing in the PDCP layer and a data amount of data without being duplicated in the PDCP layer, and the second data amount is the data amount of the duplication data.

The first data amount is sent to a first MAC entity corresponding to the first partial transmission path, and the second data amount is sent to a second MAC entity corresponding to the second partial transmission path.

The first data amount is reported to the network side through the first MAC entity, and the second data amount is reported to the network side through the second MAC entity.

Optionally, plural copies of duplication data are obtained by the duplication processing in the PDCP layer, the data amount of the duplication data is a data amount of one or more copies of the duplication data.

The processor 500 is further configured to: allocate the buffer data in the PDCP layer to a plurality of transmission paths according to predetermined ratio information if the indication information indicates not duplicating the buffer data in the PDCP layer.

The processor 500 is further configured to: according to the predetermined ratio information and a data amount corresponding to the buffer data in the PDCP layer, calculate a data amount required to be transmitted over each transmission path and reporting to a network side.

The processor 500 is further configured to: if the indication information indicates not duplicating the buffer data in the PDCP layer, send the buffer data in the PDCP over one or more transmission paths according to a relationship between a data amount of the buffer data in the PDCP layer and a predetermined threshold.

The processor 500 is further configured to: send the buffer data in the PDCP over one or more transmission paths when transmission indication information sent by an underlying protocol layer is received.

The processor 500 is further configured to: if the data amount of the buffer data in the PDCP layer is less than the predetermined threshold, send the buffer data in the PDCP layer over one transmission path; otherwise, send the buffer data in the PDCP layer over a plurality of the transmission paths.

The processor 500 is further configured to: calculate a data amount required to be transmitted over each transmission path, and report the resultant data amount to a network side.

The processor 500 is further configured to: if the indication information indicates not duplicating the buffer data in the PDCP layer, send the buffer data in the PDCP layer over one transmission path configured by a network side or predetermined based on a protocol.

The processor 500 is further configured to: calculate a data amount required to be transmitted over the transmission path configured by the network side or predetermined based on the protocol, and report the resultant data amount to the network side.

In some embodiments of the present disclosure, there is also provided a computer readable storage medium having stored a computer program thereon, the computer program is executed by a processor to implement the following steps.

Indication information for indicating whether the mobile terminal duplicates buffer data in a Packet Data Convergence Protocol PDCP layer is received.

Predetermined processing is performed on the buffer data in the PDCP layer if the indication information indicates duplicating the buffer data in the PDCP layer.

It should be noted that all the implementation manners in the foregoing embodiments can be implemented when the computer program is executed by the processor, and details are not described herein again.

Figure 6:
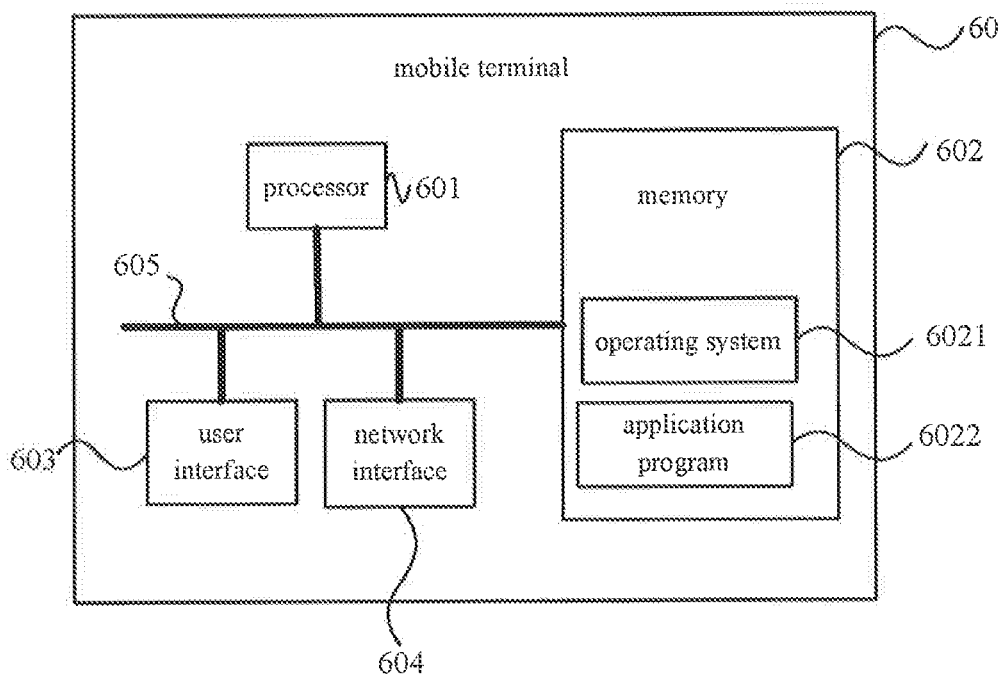
FIG. 6 is a third structural block diagram of a mobile terminal according to some embodiments of the present disclosure.

As shown in FIG. 6, FIG. 6 is another structural block diagram of a mobile terminal 600 provided by some embodiments of the present disclosure. The mobile terminal shown in FIG. 6 includes at least one processor 601, a memory 602, at least one network interface 604 and other user interfaces 603. The various components in mobile terminal 600 are coupled together by a bus system 605. It will be appreciated that the bus system 605 is used to implement connection communication between these components. The bus system 605 includes a power bus, a control bus, and a status signal bus in addition to the data bus. However, for clarity of description, various buses are labeled as the bus system 605 in FIG. 6.

The user interface 603 may include a display, a keyboard or a pointing device (e.g., a mouse, a trackball, a touchpad or a touch screen, etc.)

It is to be understood that the memory 602 in this disclosure can be either volatile memory or non-volatile memory, or can include both volatile and non-volatile memory. The non-volatile memory may be a Read-Only Memory (ROM), a Programmable ROM (PROM), an Erasable PROM (EPROM), or an Electrically EPROM (EEPROM) or a flash memory. The volatile memory can be a Random Access Memory (RAM) that acts as an external cache. By way of example and not limitation, many forms of RAM are available, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM) and Direct Rambus RAM (DRRAM). The memory 602 of the systems and methods described herein is intended to include, but is not limited to, these and any other suitable types of memory.

In some embodiments, the memory 602 stores the following elements, executable modules or data structures, or a subset thereof, or their extended set: an operating system 6021 and an application program 6022.

The operating system 6021 includes various system programs, such as a framework layer, a core library layer, a driver layer, and the like, for implementing various basic services and processing hardware-based tasks. The application 6022 includes various application programs, such as a media player, a browser, and the like, for implementing various application services. A program implementing the methods of the present disclosure can be included in the application program 6022.

In one embodiment of the present disclosure, by calling a program or an instruction stored in the memory 602, specifically, the program or instruction stored in the application program 6022, the processor 601 is configured to receive indication information for indicating whether the mobile terminal duplicates buffer data in a Packet Data Convergence Protocol PDCP layer; and perform predetermined processing on the buffer data in the PDCP layer if the indication information indicates duplicating the buffer data in the PDCP layer.

The processor 601 is further configured to: transmit, through a plurality of corresponding transmission paths, plural pieces of duplication data obtained by duplication processing if the indication information indicates duplicating the buffer data in the PDCP layer, wherein one piece of the duplication data is transmitted over one transmission path.

The processor 601 is further configured to: when transmission indication information transmitted over the transmission path is received, send one piece of the duplication data over the transmission path over which the transmission indication information is sent.

The processor 601 is further configured to: store one or more copies of the duplication data in the PDCP layer.

The processor 601 is further configured to: calculate a first data amount corresponding to a first partial transmission path and a second data amount corresponding to a second partial transmission path if the indication information indicates duplicating the buffer data in the PDCP layer, the first partial transmission path is at least one transmission path configured by a network side or predetermined based on a protocol, the second partial transmission path is transmission paths among all transmission paths corresponding to the PDCP layer other than the first partial transmission path, the first data amount is a sum of a data amount of the duplication data obtained by duplication processing in the PDCP layer and a data amount of data without being duplicated in the PDCP layer, and the second data amount is the data amount of the duplication data.

The first data amount is sent to a first MAC entity corresponding to the first partial transmission path, and the second data amount is sent to a second MAC entity corresponding to the second partial transmission path.

The first data amount is reported to the network side through the first MAC entity, and the second data amount is reported to the network side through the second MAC entity.

Optionally, plural copies of duplication data are obtained by the duplication processing in the PDCP layer, the data amount of the duplication data is a data amount of one or more copies of the duplication data.

The processor 601 is further configured to: allocate the buffer data in the PDCP layer to a plurality of transmission paths according to predetermined ratio information if the indication information indicates not duplicating the buffer data in the PDCP layer.

The processor 601 is further configured to: according to the predetermined ratio information and a data amount corresponding to the buffer data in the PDCP layer, calculate a data amount required to be transmitted over each transmission path and reporting to a network side.

The processor 601 is further configured to: if the indication information indicates not duplicating the buffer data in the PDCP layer, send the buffer data in the PDCP over one or more transmission paths according to a relationship between a data amount of the buffer data in the PDCP layer and a predetermined threshold.

The processor 601 is further configured to: send the buffer data in the PDCP over one or more transmission paths when transmission indication information sent by an underlying protocol layer is received.

The processor 601 is further configured to: if the data amount of the buffer data in the PDCP layer is less than the predetermined threshold, send the buffer data in the PDCP layer over one transmission path; otherwise, send the buffer data in the PDCP layer over a plurality of the transmission paths.

The processor 601 is further configured to: calculate a data amount required to be transmitted over each transmission path and report the resultant data amount to a network side.

The processor 601 is further configured to: if the indication information indicates not duplicating the buffer data in the PDCP layer, send the buffer data in the PDCP layer over one transmission path configured by a network side or predetermined based on a protocol.

The processor 601 is further configured to: calculate a data amount required to be transmitted over the transmission path configured by the network side or predetermined based on the protocol, and report the resultant data amount to the network side.

In the mobile terminal 600 of the embodiment of the present disclosure, the processor 601 is configured to receive indication information for indicating whether the mobile terminal duplicates buffer data in a Packet Data Convergence Protocol PDCP layer; and perform predetermined processing on the buffer data in the PDCP layer if the indication information indicates duplicating the buffer data in the PDCP layer, so that plural pieces of the duplication data in the PDCP are transmitted over a plurality of corresponding transmission paths, distinction and statistics on the duplicated data between the data without being duplicated are performed, so that a first data amount corresponding to the first partial transmission path includes the data amount of the duplicated data and the data without being duplicated, and a second data amount corresponding to the second partial transmission path only includes the data amount of the duplicated data, thereby reducing report data amount, then reducing waste of resources.

The mobile terminal of the present disclosure may be, for example, a mobile phone, a tablet computer, a personal digital assistant (PDA), an in-car computer or the like.

The mobile terminal 600 can implement various processes implemented by the terminal in the foregoing embodiment. To avoid repetition, details are not described herein again.

The above method disclosed in the embodiments of present disclosure may be applied to the processor 601 or implemented by the processor 601. The processor 601 may be an integrated circuit chip having a processing capability of signals. In the implementation process, each step of the foregoing method may be completed by an integrated logic circuit of hardware in the processor 601 or an instruction in a form of software. The processor 601 can be a general-purpose processor, a digital signal processor (DSP), an application specific integrated circuit (ASIC), a field programmable gate array (FPGA), other programmable logic devices, a discrete gate or transistor logic devices, or discrete hardware components. The methods, steps, and logical block diagrams disclosed in the embodiments of this disclosure may be implemented or carried out. The general purpose processor may be a microprocessor, any conventional processor or the like. The steps of the method disclosed in the embodiments of the present disclosure may be embodied directly by the hardware decoding processor, or by a combination of hardware and software modules in the hardware decoding processor. The software module can be located in a conventional storage medium known in the art such as random access memory, flash memory, read only memory, programmable read only memory or electrically erasable programmable memory, registers, and the like. The storage medium is located in the memory 602, and the processor 601 reads the information in the memory 602 and completes the steps of the above method in combination with its hardware.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field-programmable gate arrays (FPGAs), general processors, controllers, micro-controllers, microprocessors, other electronic units designed to perform the functions described herein, or a combination thereof.

For software implementation, the techniques described herein can be implemented by modules (e.g., procedures, functions, etc.) that perform the functions described herein. The software code can be stored in the memory and executed by the processor. The memory can be implemented within the processor or external to the processor.

Figure 7:
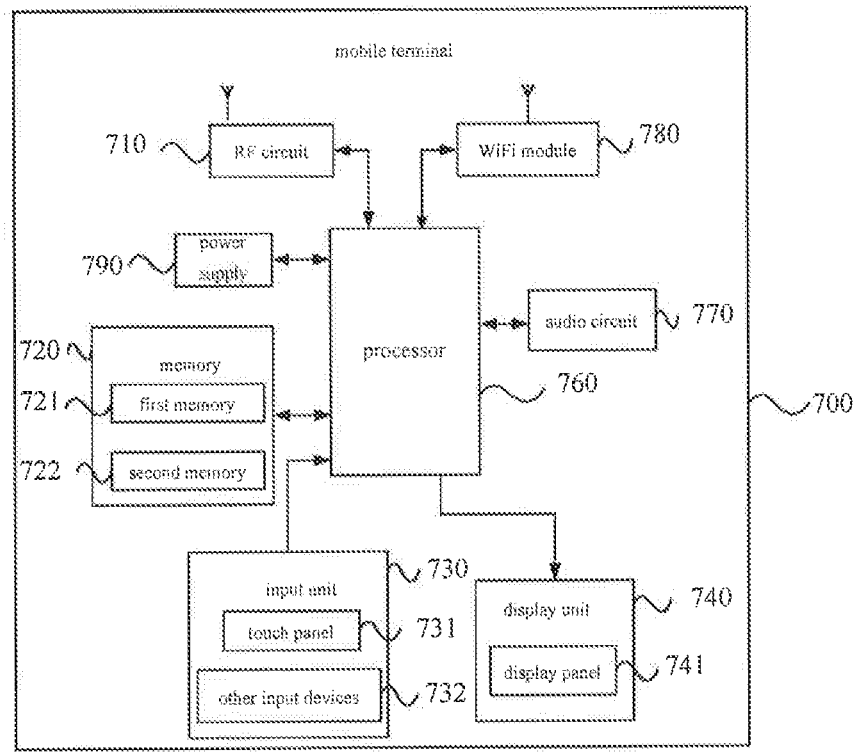
FIG. 7 is a fourth structural block diagram of a mobile terminal according to some embodiments of the present disclosure.

As shown in FIG. 7, FIG. 7 is a further structural block diagram illustrating a mobile terminal according to some embodiments of the present disclosure. The mobile terminal 700 shown in FIG. 7 includes a radio frequency (RF) circuit 710, a memory 720, an input unit 730, a display unit 740, a processor 760, an audio circuit 770, a Wireless Fidelity (WiFi) module 7100, and a power supply 790.

The input unit 730 may be configured to receive information input by a user and generate a signal input related to the user's settings and to the function control of the terminal device 700. Specifically, in the embodiment of the present disclosure, the input unit 730 may include a touch panel 731. The touch panel 731, also referred to as a touch screen, can collect the user's touch operations thereon or nearby (such as the operation of the user on the touch panel 731 using any suitable object or accessory such as a finger or a stylus), and drives the corresponding connection device according to a preset program. Optionally, the touch panel 731 may include two parts, a touch detection device and a touch controller. The touch detection device detects the touch orientation of the user, and detects a signal generated by the touch operation, and transmits the signal to the touch controller; the touch controller receives touch information from the touch detection device, converts the touch information into a coordinate of a touch point, sends the coordinate to the processor 760, and can receive and execute a command from the processor 760. In addition, the touch panel 731 can be implemented in various types such as resistive, capacitive, infrared, and surface acoustic waves, etc. In addition to the touch panel 731, the input unit 730 may further include other input devices 732. The other input devices 732 may include, but are not limited to, one or more of a physical keyboard, function buttons (such as a volume control button, a switch button, etc.), a trackball, a mouse, a joystick, and the like.

The display unit 740 may be used to display information input by the user or information provided to the user as well as various menu interfaces of the mobile terminal 700. The display unit 740 may include the display panel 741. Optionally, the display panel 741 may be configured in the form of an LCD, an Organic Light-Emitting Diode (OLED) or the like.

It should be noted that the touch panel 731 may cover the display panel 741 to form a touch display screen, and when the touch display screen detects a touch operation thereon or nearby, the touch operation is transmitted to the processor 760 to determine the type of the touch event, then the processor 760 provides a corresponding visual output on the touch display based on the type of the touch event.

The touch display includes an application program interface display area and a common control display area. The arrangement of the application program interface display area and the common control display area is not limited, and the arrangement of the two display areas may be distinguished by an up-down arrangement, a left-right arrangement, and the like. The application program interface display area may be used to display the interface of the application program. Each interface may include at least one interface element such as an application's icon and/or a widget desktop control. The application program interface display area may also be an empty interface that does not include any content. The common control display area is used to display controls with high usage, such as a setting button, an interface number, a scroll bar, a phone book icon, and the like.

The processor 760 is a control center of the mobile terminal 700, and connects various parts of the entire mobile phone by using various interfaces and lines, and performs various functions and processing data of the mobile terminal 700 by running or executing software programs and/or modules stored in the memory 721 and by calling the data stored in the second memory 722, thereby performing overall monitoring of the mobile terminal 700. Optionally, the processor 760 can include one or more processing units.

In an embodiment of the present disclosure, by calling the software program and/or module stored in the memory 721 and/or data in the second memory 722, the processor 760 is configured to receive indication information for indicating whether the mobile terminal duplicates buffer data in a Packet Data Convergence Protocol PDCP layer; and perform predetermined processing on the buffer data in the PDCP layer if the indication information indicates duplicating the buffer data in the PDCP layer.

The processor 760 is further configured to: transmit, through a plurality of corresponding transmission paths, plural pieces of duplication data obtained by duplication processing if the indication information indicates duplicating the buffer data in the PDCP layer, wherein one piece of the duplication data is transmitted over one transmission path.

The processor 760 is further configured to: when transmission indication information transmitted over the transmission path is received, send one piece of the duplication data over the transmission path over which the transmission indication information is sent.

The processor 760 is further configured to: store one or more copies of the duplication data in the PDCP layer.

The processor 760 is further configured to: calculate a first data amount corresponding to a first partial transmission path and a second data amount corresponding to a second partial transmission path if the indication information indicates duplicating the buffer data in the PDCP layer, the first partial transmission path is at least one transmission path configured by a network side or predetermined based on a protocol, the second partial transmission path is transmission paths among all transmission paths corresponding to the PDCP layer other than the first partial transmission path, the first data amount is a sum of a data amount of the duplication data obtained by duplication processing in the PDCP layer and a data amount of data without being duplicated in the PDCP layer, and the second data amount is the data amount of the duplication data.

The first data amount is sent to a first MAC entity corresponding to the first partial transmission path, and the second data amount is sent to a second MAC entity corresponding to the second partial transmission path.

The first data amount is reported to the network side through the first MAC entity, and the second data amount is reported to the network side through the second MAC entity.

Optionally, plural copies of duplication data are obtained by the duplication processing in the PDCP layer, the data amount of the duplication data is a data amount of one or more copies of the duplication data.

The processor 760 is further configured to: allocate the buffer data in the PDCP layer to a plurality of transmission paths according to predetermined ratio information if the indication information indicates not duplicating the buffer data in the PDCP layer.

The processor 760 is further configured to: according to the predetermined ratio information and a data amount corresponding to the buffer data in the PDCP layer, calculate a data amount required to be transmitted over each transmission path and report the resultant data amount to a network side.

The processor 760 is further configured to: if the indication information indicates not duplicating the buffer data in the PDCP layer, send the buffer data in the PDCP over one or more transmission paths according to a relationship between a data amount of the buffer data in the PDCP layer and a predetermined threshold.

The processor 760 is further configured to: send the buffer data in the PDCP over one or more transmission paths when transmission indication information sent by an underlying protocol layer is received.

The processor 760 is further configured to: if the data amount of the buffer data in the PDCP layer is less than the predetermined threshold, send the buffer data in the PDCP layer over one transmission path; otherwise, send the buffer data in the PDCP layer over a plurality of the transmission paths.

The processor 760 is further configured to: calculate a data amount required to be transmitted over each transmission path, and report the resultant data amount to a network side.

The processor 760 is further configured to: if the indication information indicates not duplicating the buffer data in the PDCP layer, send the buffer data in the PDCP layer over one transmission path configured by a network side or predetermined based on a protocol.

The processor 760 is further configured to: calculate a data amount required to be transmitted over the transmission path configured by the network side or predetermined based on the protocol, and report to the network side.

The mobile terminal of the present disclosure may be, for example, a mobile phone, a tablet computer, a personal digital assistant (PDA), or an in-car computer or the like.

The mobile terminal 600 can implement various processes implemented by the terminal in the foregoing embodiment. To avoid repetition, details are not described herein again.

In the mobile terminal 700 of the embodiment of the present disclosure, the processor 760 is configured to receive indication information for indicating whether the mobile terminal duplicates buffer data in a Packet Data Convergence Protocol PDCP layer; and perform predetermined processing on the buffer data in the PDCP layer if the indication information indicates duplicating the buffer data in the PDCP layer, so that plural pieces of the duplication data in the PDCP are transmitted over a plurality of corresponding transmission paths, distinction and statistics on the duplicated data between the data without being duplicated are performed, so that a first data amount corresponding to the first partial transmission path includes the data amount of the duplicated data and the data without being duplicated, and a second data amount corresponding to the second partial transmission path only includes the data amount of the duplicated data, thereby reducing report data amount, then reducing waste of resources.

Those of ordinary skill in the art will appreciate that the elements and algorithm steps of the various examples described in the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the embodiments provided by the present application, it should be understood that the disclosed device and method may be implemented in other manners. For example, the device embodiments described above are merely illustrative. For example, the division of the unit is only a logical function division. In actual implementation, there may be another division manner, for example, a plurality of units or components may be combined or may be integrated into another system, or some features can be ignored or not be executed. In addition, the mutual coupling or direct coupling or communication connection shown or discussed may be an indirect coupling or communication connection through some interfaces, devices or units, and may be in an electrical, mechanical or other form.

The units described as separate components may or may not be physically separated, and the components displayed as units may or may not be physical units, that is, may be located in one place, or may be distributed on multiple network units. Some or all of the units may be selected based on actual needs to achieve the purpose of the scheme of the embodiment.

In addition, each functional unit in various embodiments of the present disclosure may be integrated into one processing unit, or each unit may exist physically separately, or two or more units may be integrated into one unit.

If the functions are implemented in the form of software functional units and functions as an independent product for sale or use, it may also be stored in a computer readable storage medium. Based on such understanding, the substance of the technical solution of the present disclosure, or the portion of the invention that makes contribution to the state of the art, can be embodied in the form of a computer software product that is stored in a storage medium and contains plural instructions enabling a computer device (which can be a personal computer, a server, a network device, and so on) to execute the methods recited in the embodiments of the present disclosure. The storage medium includes any medium capable of storing program codes, such as a flash disk, a removable hard disk, a ROM, a RAM, a magnetic disk, or an optical disk and various mediums capable of storing program codes.

It can be understood by those skilled in the art that the whole or parts of the process of the method in the above embodiment can be realized by computer program controlling related hardware, the computer program is stored in a computer readable storage medium, when the program is executed, it can include process of the embodiment of the above each method. The storage medium may be a magnetic disk, a CD-ROM, a Read-Only Memory (ROM), a Random Access Memory (RAM), or the like.

What are described above are merely preferred embodiments of the present disclosure, and are not to limit the present disclosure, and any modification, equivalent and improvement within the spirit and principles of the present disclosure shall be covered in the protective scope of the present disclosure.

What is claimed is:

1. A data processing method, applied to a mobile terminal, comprising:
    receiving indication information for indicating whether the mobile terminal duplicates buffer data in a Packet Data Convergence Protocol (PDCP) layer; and
    performing predetermined processing on the buffer data in the PDCP layer, in response to the indication information that indicates duplicating the buffer data in the PDCP layer,
    wherein the performing predetermined processing on the buffer data in the PDCP layer, in response to the indication information that indicates duplicating the buffer data in the PDCP layer comprises:
    calculating a first data amount corresponding to a first type transmission path and a second data amount corresponding to a second type transmission path, in response to the indication information that indicates duplicating the buffer data in the PDCP layer, the first type transmission path being at least one transmission path configured by the network side or predetermined based on a protocol among all transmission paths corresponding to the PDCP layer, the second type transmission path being transmission paths among all transmission paths corresponding to the PDCP layer other than the first type transmission path, the first data amount being a sum of a data amount of duplication data obtained by duplication processing in the PDCP layer and another data amount of non-duplicated data without being subject to duplication processing in the PDCP layer, and the second data amount being the data amount of the duplication data obtained by duplication processing in the PDCP layer;
    sending the first data amount to a first Media Access Control (MAC) entity corresponding to the first type transmission path, and sending the second data amount to a second MAC entity corresponding to the second type transmission path; and
    reporting the first data amount to the network side through the first MAC entity, and reporting the second data amount to the network side through the second MAC entity.

2. The method according to claim 1, wherein the performing predetermined processing on the buffer data in the PDCP layer in response to the indication information that indicates duplicating the buffer data in the PDCP layer comprises:
    transmitting, through a plurality of corresponding transmission paths, a plural copies of duplication data obtained by duplication processing in response to the indication information that indicates duplicating the buffer data in the PDCP layer,
    wherein one copy of the duplication data is transmitted over each transmission path of the plurality of corresponding transmission paths.

3. The method according to claim 2, wherein the transmitting, through the plurality of corresponding transmission paths, the plural copies of duplication data obtained by duplication processing comprises:
    sending one copy of the duplication data over a transmission path over which transmission indication information is received, when the transmission indication information transmitted over the transmission path is received.

4. The method according to claim 2, wherein prior to the transmitting, through the plurality of corresponding transmission paths, the plural copies of duplication data obtained by duplication processing, the method further comprises:
    storing one or more copies of the duplication data in the PDCP layer.

5. The method according to claim 2, wherein the plural copies of duplication data are obtained by the duplication processing in the PDCP layer, and the data amount of the duplication data is the amount of data that the one or more copies of the duplication data contain.

6. The method according to claim 1, wherein after the receiving indication information, the method further comprises:
    allocating the buffer data in the PDCP layer to a plurality of transmission paths according to predetermined ratio information, in response to the indication information that indicates not duplicating the buffer data in the PDCP layer.

7. The method according to claim 6, wherein prior to the allocating the buffer data in the PDCP layer to a plurality of transmission paths according to predetermined ratio information, in response to the indication information that indicates not duplicating the buffer data in the PDCP layer, the method further comprises:
    calculating a data amount required to be transmitted over each transmission path according to the redetermined ratio information and a data amount corresponding to the buffer data in the PDCP layer, and reporting the calculated data amount to a network side.

8. The method according to claim 1, wherein after the receiving indication information, the method further comprises:
    sending the buffer data in the PDCP layer over one or more transmission paths according to a relationship between a data amount of the buffer data in the PDCP layer and a predetermined threshold, in response to the indication information that indicates not duplicating the buffer data in the PDCP layer.

9. The method according to claim 8, wherein the sending the buffer data in the PDCP layer over one or more transmission paths comprises:
sending the buffer data in the PDCP layer over one or more transmission paths when transmission indication information sent by an underlying protocol layer is received.

10. The method according to claim 8, wherein the sending the buffer data in the PDCP layer over one or more transmission paths according to a relationship between a data amount of the buffer data in the PDCP layer and a predetermined threshold comprises:
sending the buffer data in the PDCP layer over one transmission path, in response to the data amount of the buffer data in the PDCP layer being less than the predetermined threshold; otherwise, sending the buffer data in the PDCP layer over a plurality of the transmission paths.

11. The method according to claim 8, wherein prior to the sending the buffer data in the PDCP layer over one or more transmission paths, the method further comprises:
calculating a data amount required to be transmitted over each transmission path and reporting the calculated data amount to a network side.

12. The method according to claim 1, wherein after the receiving indication information, the method further comprises:
sending the buffer data in the PDCP layer over one transmission path configured by a network side or predetermined based on a protocol, in response to the indication information that indicates not duplicating the buffer data in the PDCP layer.

13. The method according to claim 12, wherein prior to the sending the buffer data in the PDCP layer over one transmission path configured by a network side or predetermined based on a protocol, the method further comprises:
calculating a data amount required to be transmitted over the transmission path configured by the network side or predetermined based on the protocol, and reporting the calculated data amount to the network side.

14. A mobile terminal device, comprising a processor and a memory, wherein a computer program executable on the processor is stored in the memory, when the computer program is executed by the processor, the processor implements steps of a data processing method, applied to the mobile terminal device, comprising:
receiving indication information for indicating whether the mobile terminal duplicates buffer data in a Packet Data Convergence Protocol (PDCP) layer; and
performing predetermined processing on the buffer data in the PDCP layer, in response to the indication information that indicates duplicating the buffer data in the PDCP layer,
wherein the performing predetermined processing on the buffer data in the PDCP layer, in response to the indication information that indicates duplicating the buffer data in the PDCP layer comprises:
calculating a first data amount corresponding to a first type transmission path and a second data amount corresponding to a second type transmission path, in response to the indication information that indicates duplicating the buffer data in the PDCP layer, the first type transmission path being at least one transmission path configured by the network side or predetermined based on a protocol among all transmission paths corresponding to the PDCP layer, the second type transmission path being transmission paths among all transmission paths corresponding to the PDCP layer other than the first type transmission path, the first data amount being a sum of a data amount of duplication data obtained by duplication processing in the PDCP layer and another data amount of non-duplicated data without being subject to duplication processing in the PDCP layer, and the second data amount being the data amount of the duplication data obtained by duplication processing in the PDCP layer;
sending the first data amount to a first Media Access Control (MAC) entity corresponding to the first type transmission path, and sending the second data amount to a second MAC entity corresponding to the second type transmission path; and
reporting the first data amount to the network side through the first MAC entity, and reporting the second data amount to the network side through the second MAC entity.

15. The mobile terminal device according to claim 14, wherein the performing predetermined processing on the buffer data in the PDCP layer, in response to the indication information that indicates duplicating the buffer data in the PDCP layer comprises:
transmitting, through a plurality of corresponding transmission paths, plural copies of duplication data obtained by duplication processing, in response to the indication information that indicates duplicating the buffer data in the PDCP layer,
wherein one copy of the duplication data is transmitted over each transmission path of the plurality of corresponding transmission paths.

16. The mobile terminal device according to claim 15, wherein the transmitting, through the plurality of corresponding transmission paths, the plural copies of duplication data obtained by duplication processing comprises:
sending one copy of the duplication data over a transmission path over which transmission indication information is received, when the transmission indication information transmitted over the transmission path is received.

17. The mobile terminal device according to claim 15, wherein prior to the transmitting, through the plurality of corresponding transmission paths, the plural copies of duplication data obtained by duplication processing, the method further comprises:
storing one or more copies of the duplication data in the PDCP layer.

18. The mobile terminal device according to claim 14, wherein the plural copies of duplication data are obtained by the duplication processing in the PDCP layer, and the data amount of the duplication data is the amount of data that the one or more copies of the duplication data contain.

19. A non-transitory computer readable storage medium that stores a computer program thereon, wherein when the computer program is executed by a processor, the processor implements steps of a data processing method, applied to a mobile terminal device, comprising:
receiving indication information for indicating whether the mobile terminal duplicates buffer data in a Packet Data Convergence Protocol (PDCP) layer; and performing predetermined processing on the buffer data in the PDCP layer, in response to the indication information that indicates duplicating the buffer data in the PDCP layer, wherein the performing predetermined processing on the buffer data in the PDCP layer, in response to the indication information that indicates duplicating the buffer data in the PDCP layer comprises:

calculating a first data amount corresponding to a first type transmission path and a second data amount corresponding to a second type transmission path, in response to the indication information that indicates duplicating the buffer data in the PDCP layer, the first type transmission path being at least one transmission path configured by the network side or predetermined based on a protocol among all transmission paths corresponding to the PDCP layer, the second type transmission path being transmission paths among all transmission paths corresponding to the PDCP layer other than the first type transmission path, the first data amount being a sum of a data amount of duplication data obtained by duplication processing in the PDCP layer and another data amount of non-duplicated data without being subject to duplication processing in the PDCP layer, and the second data amount being the data amount of the duplication data obtained by duplication processing in the PDCP layer;

sending the first data amount to a first Media Access Control (MAC) entity corresponding to the first type transmission path, and sending the second data amount to a second MAC entity corresponding to the second type transmission path; and reporting the first data amount to the network side through the first MAC entity, and reporting the second data amount to the network side through the second MAC entity.

* * * * *